(12) United States Patent
Rodway et al.

(10) Patent No.: US 7,565,067 B2
(45) Date of Patent: Jul. 21, 2009

(54) APPARATUS AND METHOD FOR HEATING AN INFRARED-INITIATED SPLICE SEAL

(75) Inventors: Giles Rodway, Calne (GB); Graham Miles, Swindon (GB); Martin Pope, Swindon (GB); Martyn Priddle, Swindon (GB); Philip Hammond, Wootton Bassett (GB)

(73) Assignee: Tyco Electronics UK Ltd., Wiltshire (GB)

( * ) Notice: Subject to any disclaimer, the term of this patent is extended or adjusted under 35 U.S.C. 154(b) by 99 days.

(21) Appl. No.: 11/674,209

(22) Filed: Feb. 13, 2007

(65) Prior Publication Data

US 2007/0196082 A1    Aug. 23, 2007

(30) Foreign Application Priority Data

Feb. 18, 2006   (GB) ................................. 0603293.2

(51) Int. Cl.
*F21V 7/00* (2006.01)
(52) U.S. Cl. .................... 392/420; 392/423; 219/411
(58) Field of Classification Search ................. None
See application file for complete search history.

(56) References Cited

U.S. PATENT DOCUMENTS

| 4,085,286 | A | * | 4/1978 | Horsma et al. | ............ 174/92 |
| 4,419,304 | A |   | 12/1983 | Ficke et al. | |
| 4,528,150 | A | * | 7/1985 | Charlebois et al. | ....... 264/36.19 |
| 4,719,332 | A | * | 1/1988 | Markuson, Jr. | .............. 219/388 |
| 4,749,843 | A | * | 6/1988 | Abramson | ................... 219/411 |
| 5,060,289 | A | * | 10/1991 | Abramson | ................... 392/423 |
| 5,740,314 | A |   | 4/1998 | Grimm | |
| 6,529,686 | B2 | * | 3/2003 | Ramanan et al. | ............ 392/418 |

FOREIGN PATENT DOCUMENTS

| JP | 05122817 | 5/1993 |
| JP | 06006925 | 1/1994 |
| JP | 10214669 | 8/1998 |
| JP | 11018239 | 1/1999 |

* cited by examiner

*Primary Examiner*—Thor S Campbell
(74) *Attorney, Agent, or Firm*—Barley Snyder LLC

(57) ABSTRACT

An apparatus for heating a splice seal includes structural members defining a heating area that receives a splice seal. At least one of the structural members is moveable between an open position and a closed position. At least one heat source is arranged in the heating area. The heat source directs infrared radiation toward the splice seal when the structural member is in the closed position. At least one cooling device cools the heating area when the structural member is in the closed position.

7 Claims, 2 Drawing Sheets

APPARATUS AND METHOD FOR HEATING AN INFRARED-INITIATED SPLICE SEAL

CROSS-REFERENCE TO RELATED APPLICATIONS

This application claims the benefit of the filing date under 35 U.S.C. § 119(a)-(d) of Great Britain Patent Application No. GB 0603293.2, filed Feb. 18, 2006.

1. Field of the Invention

This invention relates to an apparatus and method for heating an infrared-initiated splice seal wherein the apparatus has at least one cooling device that operates simultaneously with the heating of the infrared-initiated splice seal.

2. Background

Wire splices are commonly used in electrical harnesses in the automotive industry. One of the most common splice configurations is known as an "in line splice." In an "in line splice," electrically insulative covering is removed from at least one end of each wire that is to be spliced to expose conductors. The wires are then arranged such that all of the exposed conductors are substantially parallel with and overlap each other. The exposed conductors are then crimped, welded, soldered or otherwise joined together to form a splice.

The splice and the exposed conductors adjacent thereto are then sealed to protect the splice from the external environment. A preferred means for protecting the splice and sealing out moisture and other contaminants is to encase the splice in dimensionally recoverable or heat shrink tubing, which has a sealant and/or adhesive inner liner. The outer liner comprises a cross-linked polymeric heat-shrinkable sleeve that is either clear or black. The inner liner comprises a heat-flowable adhesive and/or sealant and is clear. An example of such a splice seal is the RAYCHEM RBK-ILS-125 splice seal available from Tyco Electronics, which is well suited for rapid installation when used in combination with customized application equipment, for example the RAYCHEM RBK-ILS Mk2 heating apparatus/processor also available from Tyco Electronics.

The splice seals are installed by sliding the outer liner and the inner liner over the area to be sealed. Heat is then applied to the splice seal using a heat gun, flame, infrared, or other heat source. The heat simultaneously causes the outer liner to shrink about the splice and the sealant and/or adhesive of the inner liner to melt. The outer liner shrinks around the exposed conductors, and the adhesive and/or sealant flows within the outer liner to cover and seal the conductors. The adhesive and/or sealant also flow along the wires to contact and cover a portion of the unstripped, electrically insulative wire covering. This provides a seal over the entire length of the conductors and the splice up to and including a portion of the insulative wire covering. Thus, water is prevented from entering the splice and/or from flowing along the conductors inside the electrically insulative wire covering. Wire butt splices and wire splices to ring terminals or other termination devices can also be sealed and protected in this way. In addition, connectors may be sealed against water ingress and bundles of wires blocked using adhesive inserts in combination with the above-described heat shrink tubing.

Such splice seals are well known in a range of different materials and sizes and are used in various industries for environmental sealing of cable and wire splices. The minimum time taken to achieve a sealed splice depends on a number of factors including the number and size of the component wires that make up the splice, the size of the slice seal, the recovery temperature of the splice seal, the melting temperature of the inner and outer liners, the viscosity of the outer liner at the recovery temperature, the hoop stress of the splice seal at the recovery temperature, the temperature of the splice, the type of heating device employed and its thermal characteristics.

The complexity of vehicle harnesses and the number of wire splices incorporated in the harnesses are increasing due to the growing number of electrical functions on modern vehicles. As a result, vehicle manufacturers are using an increasing number of methods to seal splices in order to ensure electrical integrity and guarantee reliability. In order to maximize productivity and minimize cost, it is therefore necessary that the time taken to perform a splice seal be kept at a minimum. Additionally, in current heating processes, the outer liner is predominantly heated by conduction and/or convection. Heating of the outer liner by conduction and/or convection is inefficient and requires either high temperatures or long installation times, which can damage the outer liner and slow down productivity.

BRIEF SUMMARY

An apparatus for heating a splice seal includes structural members defining a heating area that receives a splice seal. At least one of the structural members is moveable between an open position and a closed position. At least one heat source is arranged in the heating area. The heat source directs infrared radiation toward the splice seal when the structural member is in the closed position. At least one cooling device cools the heating area when the structural member is in the closed position.

A method for heating a splice seal includes providing structural members that define a heating area; supporting the splice seal in the heating area; directing infrared radiation toward the splice seal; and cooling the heating area with a cooling device simultaneously with directing the infrared radiation toward the splice seal.

DETAILED DESCRIPTION OF THE EMBODIMENT(S)

Figure 1:
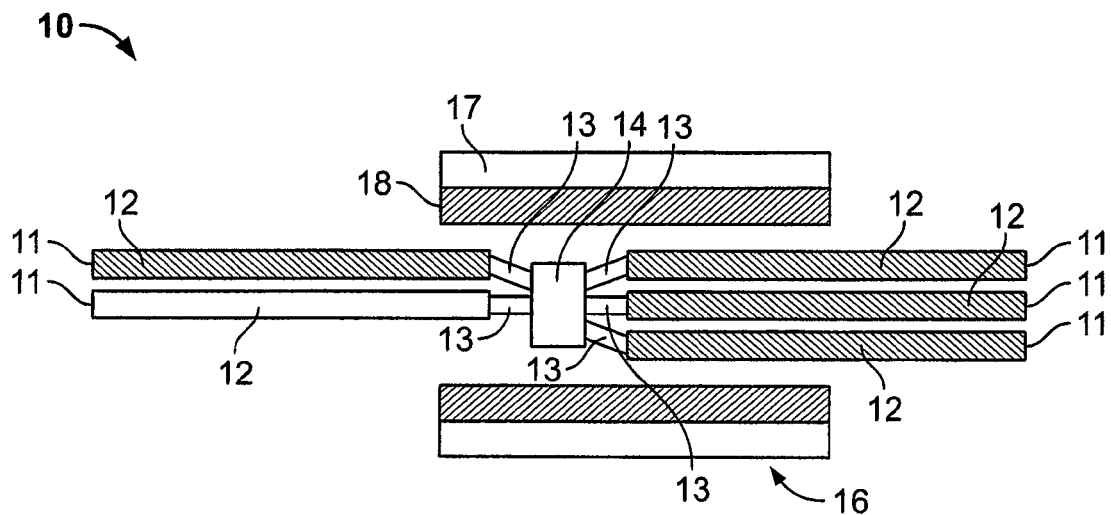
FIG. 1 is a schematic sectional view of an infrared initiated splice seal according to an embodiment of the invention.

FIG. 1 shows an infrared-initiated splice seal 10 according to an embodiment of the invention. The term "infrared-initiated splice seal" is an arrangement for protecting and sealing otherwise exposed wire splices whose installation relies on heating using infrared energy to commence a process of fitting a seal about a splice. In the illustrated embodiment, the infrared-initiated splice seal 10 is applied to a known in-line splice. However, the infrared-initiated splice seal 10 could be applied in a range of other constructions, for example, ring terminals, butt splices, connector seals and bundle blocks. For convenience herein certain structures are referred to as "splices" and, as the context requires, "splice seals", although in practice some of the structures, to which the invention relates, may not require actual splicing together of electrical conductors or other filaments.

As shown in FIG. 1, the infrared-initiated splice seal 10 includes a plurality of wires 11 laid in abutting relationship with each other such that the wires 11 are connectable. The wires 11 have electrically insulating covers 12. A portion of the electrically insulating covers 12 are removed at one end of the wires 11 to expose conductors 13 over a predetermined length of the wires 11. The exposed conductors 13 are then joined together by a crimp 14 to electrically connect the wires 11 and form a splice.

A substantially cylindrical sleeve 16 substantially surrounds the splice and extends along the wires 11 to either side thereof. The sleeve 16 comprises an outer liner 17 and an inner liner 18. The outer liner 17 is formed of a recoverable material or heat shrink tubing and is infrared-transmitting. The outer liner 17 may be formed, for example, of a clear polymer material such as a high density polyethylene that is substantially transparent to infrared radiation so that there is minimal absorption of infrared radiation by the outer liner 17.

The inner liner 18 is fusable and comprises a sealant and/or adhesive such as a polyamide adhesive. The inner liner 18 is formed such that the inner liner 18 absorbs infrared energy. The inner liner 18 may be formed, for example, of a black material such as carbon black or other pigment to increase the rate of infrared heating of the inner liner 18 when subject to infrared radiation. For example, the level of carbon black required to increase significantly the radiant heating of the inner liner 18 is surprisingly low, for example, as low as 0.0125%, depending on the grade of carbon black selected, and will normally be in the range 0.0001%-10%, preferably 0.001%-5%, most preferably 0.01%-1.0%, by weight of the whole inner liner 18. The outer and inner liners 17, 18 may be co-extruded to create an effective interface for heat transfer from the inner liner 18 to the outer liner 17. Alternatively, the inner liner 18 may be coated onto an interior of the outer liner 17.

Examples of suitable sleeves 16 include Tyco ES2000, Tyco ES1000 or RAYCHEM RBK-ILS-125, Additionally, Tyco Type 2672, which contains 0.5% added Wilson 6BK40, a color master batch, which incorporates the equivalent of 0.0125% carbon black.

On heating of the infrared-initiated splice seal 10 using infrared radiation, the inner liner 18 of the sleeve 16 absorbs infrared heat energy, melts and surrounds the metallic conductors 13 and the crimp 14 to seal the splice. At the same time, heat shrinking of the outer liner 17 occurs such as to compress the liquefied inner liner 18 and force it into intimate, sealing contact with the exposed conductors 13 of the splice.

Judicious choice of the materials of the outer and inner liners 17, 18 and the heating regime applied thereto, results in a highly efficient sealing method. The use of co-extruded or coated outer and inner liners 17, 18 further increases the efficiency of the operation of the sleeve 16. Additionally, forming the outer liner 17 from a clear material allows a high proportion of the transmitted radiation to be absorbed by the inner liner 18 thereby increasing the rate of heating, accelerating the reduction of viscosity, decreasing the installation time and reducing polymer damage due to heating.

Figure 2:
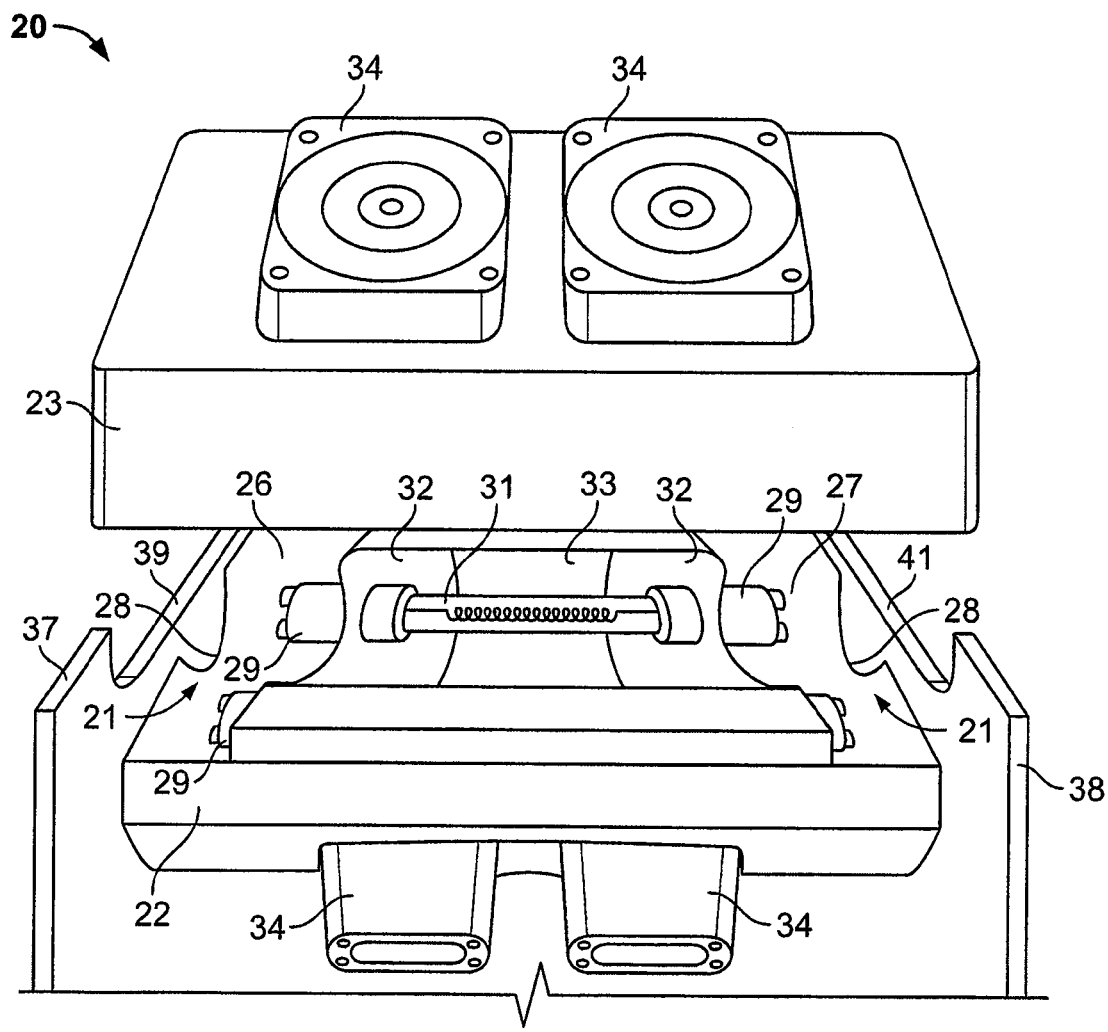
FIG. 2 is a perspective view a heating apparatus according to an embodiment of the invention.

FIG. 2 shows a heating apparatus 20 according to an embodiment of the invention. The heating apparatus 20 may be used, for example, for heating the infrared-initiated splice seal 10 in a production environment involving a heavy duty cycle in which large numbers of the infrared-initiated splice seals 10 are serially heated. As shown in FIG. 2, the heating apparatus 20 comprises a heating area 21 defined by lower and upper structural members 22, 23. In the illustrated embodiment, the lower and upper structural members 22, 23 consist of a pair of rigid, metallic shells supported in a framework. The lower and upper structural members 22, 23 may be moved between an open and closed position, for example, by a hinge (not shown) to open and close the heating area 21.

Each of the lower and upper structural members 22, 23 includes a plurality of walls that define a hollow interior when the lower and upper structural members 22, 23 are in the closed position. Edges of the walls of the lower structural member 22 abut edges of the walls of the upper structural member 23 in the closed position. Each of the lower and upper structural members 22, 23 comprises a pair of end walls 26, 27 and outer walls 37, 38. Each of the end walls 26, 27 has a substantially semi-circular wire receiving cut-out 28 formed therein. The wire receiving cut-outs 28 are formed to receive the wires 11 of the infrared-initiated splice seal 10. The outer walls 37, 38 substantially surround the end walls 26, 27. The outer walls 37, 38 provide structural support for the heating apparatus 20 and also form part of a safety and insulation guard intended to protect operators of the heating apparatus 20. The outer walls 37, 38 include recessed portions 39, 41 that communicate with the wire receiving cut-out 28 when the lower and upper structural members 22, 23 are in the closed position.

Support brackets 29 extend along a length of the heating area 21. Each of the support brackets 29 is configured to operatively support a heat source 31 therein (only one of the heat sources 31 is shown in FIG. 2). The heat sources 31 may be, for example, infrared emitters, lamp bulbs, heating lamps, quartz halogen lamps. The heat sources 31 are arranged to direct infrared heat energy from an outer part of the heating area 21 towards a center axis of the heating area 21 where the infrared-initiated splice seal 10 is positioned during heating. The heat sources 31 generate energy, for example, in a wavelength range of approximately 1.3-1.7 microns or more preferably 1.3-1.4 microns or 1.6 to 1.7 microns. The heating apparatus 20 may include one or more switches for selectively switching on and off the heat sources 31 according to a switching sequence corresponding to desired heating period.

At each end of the support brackets 29 is a connector clamp 32 for supporting the heat sources 31 and connecting the heat sources 31 to a source of electrical power. Reflectors 33 are provided in the heating area 21 between each of the heat sources 31 and the exterior walls of the lower and upper structural members 22, 23. The reflectors 33 intensify the radiant heat energy that is directed towards the infrared-initiated splice seal 10. Although only two of the heat sources 31 are shown in the illustrated embodiment, it will be appreciated by those skilled in the art that the number and location of the heat sources 31 may vary according to the desired internal arrangement of the heating apparatus 20.

The exterior walls of the lower and upper structural members 22, 23 are provided with openings that receive cooling devices 34. The cooling devices 34 may be, for example, fans capable of blowing air or other gases. The cooling devices 34 are arranged to blow air from an exterior of the heating area 21 into an interior of the heating area 21. The cooling devices 34 blow air over the various structural elements in the heating apparatus 20, such as the walls of the lower and upper structural members 22, 23, the wire receiving cut-outs 28, the heat sources 31, the support brackets 29 and the reflectors 33. Cooling the reflectors 33 is particularly advantageous, because the reflectors 33 are prone to heating by thermal cycling and can thereby conduct heat to a range of other components connected thereto. Therefore, such an arrangement reduces the temperature of the various structural elements while not inhibiting the conveyance of infrared energy from the heat sources 31 to the inner liner 18 of the sleeve 16.

During operation of the heating device 20, the lower and upper structural members 22, 23 are moved to the open position. One of the pre-assembled infrared-initiated splice seals 10 is inserted into the heating area 21, for example, by a moveable support (not shown) such as a carriage. The lower and upper structural members 22, 23 are moved to the closed position. The heat sources 31 and the cooling devices 34 are simultaneously activated. Because the heat sources 31 and the cooling devices 34 are activated at the same time, the heating of the sleeve 16 occurs predominately by radiation and to no appreciable extent by conduction or convection. This allows for short processing times, without unacceptably diminishing the amount of time needed for insertion of the infrared-initiated splice seal 10 in the heating apparatus 20.

When the sleeve 16 has been sealed to the splice, the lower and upper structural members 22, 23 are returned to the open position. The heat sources 31 and the cooling devices 34 may be switched off while the lower and upper structural members 22, 23 are in the open position. Alternatively, the cooling devices 34 may be operated continuously or activated at least before heating commences. The sealed infrared-initiated splice seal 10 is removed from the heating apparatus 20, and another infrared-initiated splice seal 10 is positioned therein. The process is then repeated. Such an arrangement allows for rapid, serial processing of the infrared-initiated splice seals 10 in the heating apparatus 20.

Between the reflector and the rear support frame was fitted a water cooled heat sink with thermal contact to the adjacent structural member. Cold water was pumped through the heat conducting tube of the heat sink at a rate of 1 liter per minute. In an alternative embodiment of the same processor, the water-cooled heat sink was replaced with two cooling fans on each structural component which in use forced air over and around aluminum reflective shields and other components in the processor. Each cooling fan had an air flow of about 25 m$^3$ per hour.

The effect of active cooling can be seen in the table below. Using the quartz halogen modified heat source the installation window for a 7:4 infrared-initiated splice seal was 6-9 seconds when the system is allowed time to equilibrate between installations. However when 10 infrared-initiated splice seals were installed using a 6 second installation time with 10 seconds between each installation then it became impossible to seal the infrared-initiated splice seals without damage and the installation window was reduced to zero. When the heat source was further modified to include active cooling using either water or air then an installation window of 6-8 seconds could be maintained and a high duty cycle implemented.

| Outer Liner | Inner Liner | Cooling | Approx. Peak Wavelength (microns) | Installation Window (one installation)(s) | Installation Window (ten installations)(s) |
|---|---|---|---|---|---|
| ES1000 clear | 2672 black | off | 1.3-1.4 | 6-9 | 0 |
| ES1000 clear | 2672 black | on | 1.3-1.4 | 6-9 | 6-8 |

Figure 3:
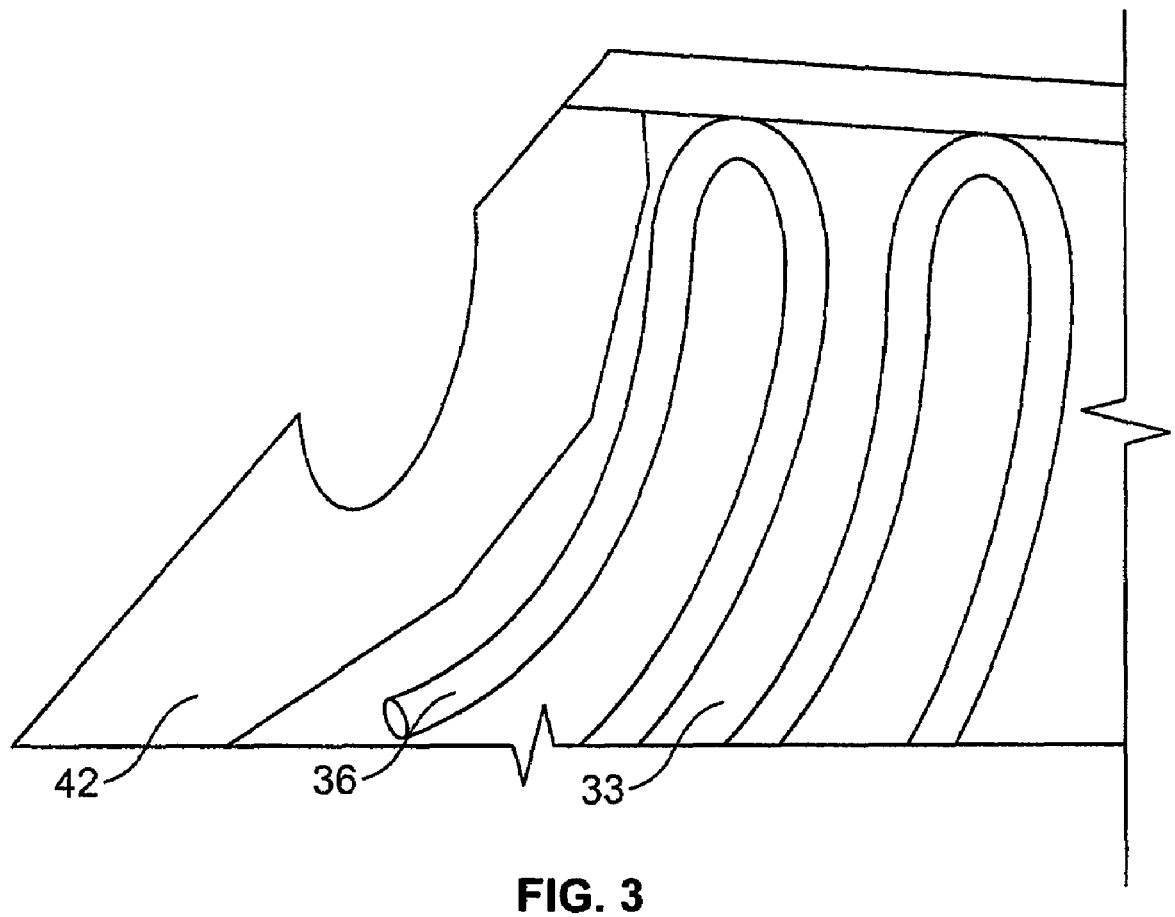
FIG. 3 is a perspective view of an alternate embodiment of the heating apparatus shown in FIG. 2.

FIG. 3 shows an alternate embodiment of the heating apparatus 20 shown in FIG. 2. In the heating apparatus 20 shown in FIG. 3, the cooling devices 34 are in the form of a heat exchanger such as a heat sink. The heat exchanger consists of a heat conducting tube 36 that is secured in heat-transferring contact with the walls of the lower and upper structural members 22, 23. The heat conducting tube 36 may be, for example, a copper tube. The heat conducting tube 36 is mounted on an interior surface of a shell 42 such that the heat conducting tube 36 substantially meanders over the interior surface of the shell 42. The shell 42 is fitted onto one or both of the lower and upper structural members 22, 23 such that the heat conducting tube 36 contacts the walls of the lower and upper structural members 22, 23. For example, the heat conducting tube 36 could extend over the entire inner surface of the lower structural member 22 and the upper structural member 23. A cooling fluid, such as chilled water, may be pumped through the heat conducting tube 36 so as to perform a heat exchange with the material of the lower and upper structural members 22, 23 thereby cooling the heating area 21 by conduction. The cooling fluid may be pumped, for example, at a rate of 1 liter per minute. The heating apparatus 20 shown in FIG. 3 therefore has the same advantages as the heating apparatus 20 shown in FIG. 2.

In one practical embodiment of the invention a RBK-ILS Mk2 processor from Tyco Electronics was modified to include six 400 W quartz halogen lamps which, when powered in series at 85V and 15 A, had a wavelength of approximately 1.3 microns. The halogen lamps were switched on only during the heating cycle. Within each structural member containing three lamps was fitted an aluminum reflector to focus the radiation towards the infrared-initiated splice seal.

The effect of active cooling can be seen in temperature monitoring of the heating components. The RBK-ILS Mk2 processor from Tyco Electronics was modified to include six 400 W quartz halogen lamps which, when powered in series at 85V and 15 A, had a wavelength of approx. 1.3 microns. These were switched on only during the heating cycle. Behind each structural member containing three lamps was fitted an aluminized reflector to focus the radiation towards the infrared-initiated splice seals. Between the reflector and the rear support frame was fitted a water cooled heat sink. Cold water was pumped through a heat conducting tube of the heat sink at a rate of 1 liter per minute. The temperature of the reflector was monitored during a very high duty cycle of 30 installations with an installation time of 6 seconds and 6 seconds between installations. Without cooling, the temperature reached an average of 270 degrees Celsius after 2 cycles. With cooling, the temperature reached an average of 110 degrees Celsius. Using fan cooling the equilibrium temperatures with and without cooling during the same cycle were 270 degrees Celsius and 110 degrees Celsius, respectively. Thus, the invention provides an effective, practical and low-cost arrangement that dramatically improves the performance of heating apparatuses for infrared-initiated splice seals.

The most widely used heat source for installation of splice seals in a high volume automotive environment is the aforesaid RBK-ILS Mk2 processor from Tyco Electronics. This comprises a retractable oven which uses hot wire filaments. Other oven configurations are available, for example the Model 19 belt heating apparatus also from Tyco Electronics. These so-called "infrared" heating apparatus use a relatively low filament temperature which produces a relatively long wavelength that is not optimized for infrared heating. As a result, the heating effect is non-selective and there is significant convection heating of the splice and substrate. Using a recommended ILS processor setting of 500, the minimum times for existing number 3 size splice seals to seal a 7-wires-to-4-wires splice using 0.5 mm² cross section area wires are given below.

| Outer Liner | Inner Liner | Heating | Approx. Peak Wavelength (microns) | Minimum Time to seal (secs) |
|---|---|---|---|---|
| ES2000 black | 2672 clear | ILS Mk 2 | 2.8 | 17 |
| ES2000 black | 2672 black | ILS Mk 2 | 2.8 | 16 |
| ES1000 clear | 2672 clear | ILS Mk 2 | 2.8 | 20 |
| ES1000 clear | 2672 black | ILS Mk 2 | 2.8 | 19 |

Installation times can be reduced by use of a shorter wavelength. A heating apparatus comprising three fast medium infrared emitters supplied by Hereaus, when powered at 95V, produces a filament temperature of approx. 1500 degrees Celsius and a peak wavelength at 1.6-1.7 microns. Using this infrared heating on the clear outer liner/black inner liner sleeve, the installation times for sealing the same 7:4 splice as above are much shorter as shown in the table below with controls using the black ES2000 outer liner, the clear ES1000 liner and higher infrared wavelengths. The control results are signified by asterisks.

| Outer Liner | Inner Liner | Heating | Approx. Peak Wavelength (microns) | Minimum Time to seal (Single Installation) (s) |
|---|---|---|---|---|
| ES2000 black* | 2672 clear | Fast Medium | 1.6-1.7 | >12 |
| ES2000 black* | 2672 black | Fast Medium | 1.6-1.7 | >12 |
| ES1000 clear | 2672 clear* | Fast Medium | 1.6-1.7 | 12 |
| ES1000 clear | 2672 black | Fast Medium | 1.6-1.7 | 9 |
| RNF100 clear | 2672 black | Fast Medium | 1.6-1.7 | 9 |
| ES1000 clear | 2672 black | Short | 1.4-1.5 | 6 |
| ES1000 clear | 2672 black | ILS Mk 2 | 2.8 | 16 |

For any given combination of splice, substrate, heating apparatus and temperature there is a time interval in which a successful seal can be created. This is known as the installation window and is defined by a minimum time to seal and a maximum time after which there is heat damage to either the splice seal or wire substrate. The sealing time of 9 seconds for the clear on black sleeve in an infrared heating apparatus is much shorter than for both the black on clear and the black on black sleeve in the same heating apparatus and very much shorter than the same sleeve in the longer wavelength heating apparatus. A very short sealing time of 6 seconds can be achieved using an even shorter wavelength but the time to damage the splice seal or wire substrate is also reduced and the installation window can become impractically small.

Improved sealing times have also been demonstrated in another infrared heating apparatus. In this practical embodiment, the RBK-ILS Mk2 processor from Tyco Electronics has been modified to include six 400 W quartz halogen lamps. The lamps are switched on only during the splice seal heating cycle. The lamps are powered in series at 85V, 15 A and have a wavelength of approx. 1.3 microns. The following minimum times to seal are observed:

| Outer liner | Inner Liner | Heating Apparatus | Approx. Peak Wavelength (microns) | Minimum Time to seal (Single Installation) (s) |
|---|---|---|---|---|
| ES2000 black | 2672 clear | Quartz halogen | 1.3-1.4 | 8 but damaged |
| ES1000 clear | 2672 clear | Quartz halogen | 1.3-1.4 | 9 |
| ES1000 clear | 2672 black | Quartz halogen | 1.3-1.4 | 6 |

A high volume production environment requires a short installation time of a few seconds that remains consistent during an extended rapid cycling. Infrared heating of a splice seal having a clear outer liner and black inner liner can deliver short installation times. However, cumulative heating of oven components during cycling can lead to degradation of the installation window, sometimes to the point where installation is no longer possible without unacceptable damage to the splice seal. The use of a splice seal having a clear outer liner and black inner liner in combination with infrared heating works well for single installations but is not suitable for consistent rapid installations in high volume as required in the automotive industry.

In particular, infrared lamps in both continuous and switched operation cause variable heating of oven components such as the structural members and reflectors. These heated components in turn cause an increased equilibrium temperature and convection heating of the splice seal. Installation windows are reduced such that minimum times to seal and damage the splice seal vary according to frequency of use. It becomes difficult to seal splices satisfactorily and reproducibly without undesirable and impractical delays between installations to allow components to cool and equilibrate. This is unsuitable for a high volume production environment where consistent, reproducible installation of splice seals is required. In some cases, when operating a high duty cycle, the practical installation window for a splice seal can be reduced to zero such that damage to the splice seal can occur and satisfactory sealing cannot be achieved.

The effect of a high duty cycle can be seen in the illustration below. Using the quartz halogen modified heating apparatus, as described above, the minimum time to seal a 7:4 splice is six seconds and, when the system is allowed time to equilibrate between installations, the maximum heating time before damage is 9 seconds. The installation window of 6-9 seconds is acceptable. However when 10 splices are installed using a 6 second installation time with 10 seconds between each installation then it becomes impossible to seal the splice without damage and the installation window is reduced to zero.

| Outer Liner | Inner Liner | Approx. Peak Wavelength (microns) | Installation Window (one installation) (s) | Installation Window (ten installations)(s) |
|---|---|---|---|---|
| ES1000 clear | 2672 black | 1.3-1.4 | 6-9 | 0 |

The use of convection and/or conduction to cool the structural members and/or the splice support of a splice heating apparatus advantageously and unexpectedly assures that the problems, caused by heat build-up during production duty cycles of the heating apparatus, do not arise. Simultaneously, the desired infrared heating effect occurs unhindered, thereby permitting efficient completion of the splice seals.

Thus, in summary, to eliminate the problems of variable convective heating and to enable rapid, consistent, high volume production of the infrared-initiated splice seals 10, the invention comprises a heating apparatus 20 including both the heat sources 31 and the cooling devices 34. The cooling devices 34 reduce and stabilize the equilibrium temperature of the components in the heating area 21 and the environment of the sleeve 16. To further reduce the effect of undesirable heating the heat sources 31 may be switched on only for the period of installation and turned off during the loading and removal of the infrared-initiated splice seals 10. The cooling devices 34 stabilize the heating of the heating apparatus 20 such that the equilibrium temperature becomes independent of the duty cycle employed. Further, convection heating is reduced and practical installation windows can be maintained using a practical duty cycle.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An apparatus for heating a splice seal, comprising:
   structural members defining a heating area that receives a splice seal, at least one of the structural members being moveable between an open position and a closed position;
   at least one heat source arranged in the heating area that directs infrared radiation toward the splice seal when the structural member is in the closed position; and
   at least one water-cooled heat sink that simultaneously cools the heating area when the structural member is in the closed position.

2. The apparatus of claim 1, wherein the heat sink includes at least one heat-conducting tube in conducting contact with at least one of the structural members.

3. The apparatus of claim 1, further comprising a reflector mounted in the heating area that directs the infrared radiation toward the seal splice.

4. The apparatus of claim 1, wherein the infrared radiation is in a wavelength range of approximately 1.3-1.7 microns.

5. The apparatus of claim 1, wherein the heat source is a lamp.

6. The apparatus of claim 1, further comprising at least one switch that selectively switches the heat source on and off according to a switching sequence corresponding to desired heating period.

7. The apparatus of claim 1, wherein the heat source is an infrared emitter having a filament temperature of approximately 1500° C. and a peak wavelength of approximately 1.6-1.7 microns.

* * * * *